United States Patent
Atis et al.

(10) Patent No.: US 8,481,134 B2
(45) Date of Patent: Jul. 9, 2013

(54) BIODEGRADABLE MOISTURE-IMPERMEABLE PACKAGES FOR CONSUMER GOODS

(75) Inventors: Balanda Atis, Newark, NJ (US); François Pradier, Paris (FR); Mohamed Kanji, Edison, NJ (US); Evelyn Brereton, Ewing, NJ (US); Linda Gavin, Gillette, NJ (US)

(73) Assignee: L'Oreal. (FR)

( * ) Notice: Subject to any disclaimer, the term of this patent is extended or adjusted under 35 U.S.C. 154(b) by 0 days.

(21) Appl. No.: 12/865,496

(22) PCT Filed: Feb. 2, 2009

(86) PCT No.: PCT/US2009/000712
§ 371 (c)(1),
(2), (4) Date: Sep. 28, 2010

(87) PCT Pub. No.: WO2009/099607
PCT Pub. Date: Aug. 13, 2009

(65) Prior Publication Data
US 2011/0045215 A1   Feb. 24, 2011

Related U.S. Application Data

(60) Provisional application No. 61/025,518, filed on Feb. 1, 2008.

(51) Int. Cl.
*B27N 5/02* (2006.01)
*B32B 1/02* (2006.01)

(52) U.S. Cl.
USPC ....... 428/35.6; 428/34.1; 428/34.2; 428/35.7; 428/36.6; 428/36.92

(58) Field of Classification Search
USPC ............. 428/34.1, 34.2, 34.3, 34.8, 35.2, 428/35.4, 35.5, 35.6, 35.7, 36.6, 36.9, 36.91, 428/36.92
See application file for complete search history.

(56) References Cited

U.S. PATENT DOCUMENTS 5,591,491 A * 1/1997 Ando et al. ............. 427/544

FOREIGN PATENT DOCUMENTS

| DE | 19814373 | 10/1999 |
|---|---|---|
| DE | 10219051 | 11/2002 |
| GB | 2348861 | 10/2000 |
| WO | 9306013 | 4/1993 |
| WO | 9603886 | 2/1996 |
| WO | 9945073 | 9/1999 |
| WO | 02088245 | 11/2002 |

OTHER PUBLICATIONS

Wikipedia (www.wikipedia.com) entry for "Reducing sugar", accessed Mar. 17, 2012.*
International Search Report, PCT/US09/00712, dated May 14, 2009.

* cited by examiner

*Primary Examiner* — Walter B Aughenbaugh
(74) *Attorney, Agent, or Firm* — Lerner, David, Littenberg, Krumholz & Mentlik, LLP

(57) ABSTRACT

A biodegradable package includes a shaped body formed from a composition that contains: (i) a source of starch; (ii) a strengthening agent; (iii) a binding agent; (iv) a plasticizer; and a moisture-impermeable film covering at least a portion of the shaped body.

12 Claims, 2 Drawing Sheets

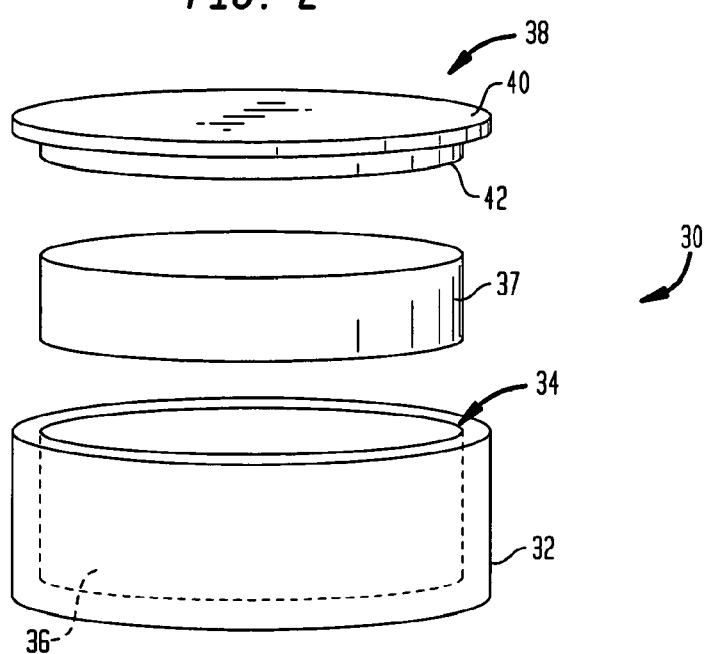

BIODEGRADABLE MOISTURE-IMPERMEABLE PACKAGES FOR CONSUMER GOODS

CROSS-REFERENCE TO RELATED APPLICATION

This application is a national phase entry under 35 U.S.C. §371 of International Application No. PCT/US2009/000712, filed Feb. 2, 2009, published in English, which claims the benefit of the filing date of U.S. Provisional application No. 61/025,518, filed Feb. 1, 2008, the contents of which are incorporated by reference.

TECHNICAL FIELD

The present invention relates to biodegradable packages that are shaped to contain a wide variety of consumer goods, including for example, cosmetic compositions.

BACKGROUND ART

The disposal of non-biodegradable and non-recyclable (non-renewable) waste is a pressing environmental challenge. Contributing to the problem is the disposal of packaging materials for a variety of household and personal care products. These materials are typically are made of plastic and/or metal.

Various attempts have been made to address this problem. International Patent Application Publication WO 91/06601, for example, teaches biodegradable polymer compositions containing one or more polymers and a filler. The filler contains a degradation-enhancing material and a biodegradable safening material. According to the specification, the safening material inhibits the degrading activity of the enhancing material. Thus, once the safening material is degraded, the activity of the degradation enhancer is restored.

International Patent Application Publication WO 96/03886 teaches biodegradable moldings for packaging food or non-food products. The moldings contain a self supporting base, obtained by baking a suspension based on a starch product, and a water-resistant film made of wax components.

U.S. Patent Application Publication No. 20060265952 A1 teaches containers dimensioned and configured so as to accommodate consumable products such as cosmetics, hair and skin care products, foods, small appliances and optical disks. The containers are made of a biodegradable material containing plant seed.

U.S. Pat. No. 6,533,854 teaches shaped bodies useful as packaging materials. The bodies are made from a bakeable mass produced by mixing from 7.8 to 8.5% by weight of cellulosic fibers, from 16.1 to 17.6% by weight of native starch, from 5.4 to 6.0% by weight of pregelatinized starch and from 68.0 to 70.6% by weight of water. The bakeable mass is formed into a shaped body and then baked to produce a biodegradable package.

SUMMARY OF THE INVENTION

The present invention is directed to biodegradable packages that can be made at least predominantly, and in some cases, entirely from food-grade ingredients. Thus, the packages of the present invention are both environmentally friendly and made of renewable ingredients. In addition, they may be shaped and configured to contain a wide variety of consumer goods, especially cosmetic compositions. The biodegradable packages contain at least one shaped body that in preferred embodiments is rigid or substantially rigid so the package maintains its shape and ability to hold the consumer good during prolonged storage without breaking.

Accordingly, a first aspect of the present invention is directed to a biodegradable package, comprising a first shaped body formed from a first composition that contains: (i) a source of starch; (ii) a strengthening agent; (iii) a binding agent; (iv) a plasticizer; and a first moisture-impermeable film covering at least a portion of the first body. In preferred embodiments, the package contains a cosmetic composition that is easily removable.

A second aspect of the present invention is directed to biodegradable package, made by a process comprising:
(a) preparing a moldable composition comprising:
  (i) a solvent comprising water;
  (ii) a starch-containing material;
  (iii) a strengthening agent;
  (iv) a binding agent; and
  (v) a plasticizer;
(b) introducing the moldable composition into a mold to form a shaped body;
(c) baking the shaped body; and then
(d) covering at least a portion of the shaped body with a moisture-impermeable film.

A third aspect of the present invention is directed to a moldable composition, comprising: (i) a solvent comprising water; (ii) a starch-containing material; (iii) a strengthening agent; (iv) a binding agent; and (v) a plasticizer. In preferred embodiments, the moldable composition further contains a bulking agent. In other preferred embodiments, the moldable composition contains water in an amount of about 20% to about 30% by weight, the starch-containing material in an amount of about 35% to about 45% by weight, the strengthening agent in an amount of about 6% to about 12% by weight, the binding agent in an amount of about 0.5% to about 1.5% by weight, the plasticizer in an amount of about 3% to about 6% by weight, and the bulking agent in an amount of about 12% to about 18% by weight, wherein all the amounts are based on total weight of the moldable composition. In other preferred embodiments, the moldable composition is characterized in that the starch-containing material includes long-grain rice flour, the strengthening agent includes oat fibers, the binding agent includes sodium chloride, the plasticizer includes vegetable shortening and gluten, and the bulking agent includes sucrose and maltodextrin.

Yet a fourth aspect of the present invention is directed to a process for making a biodegradable package, comprising a first shaped body, wherein the process comprises:
(a) preparing a first moldable composition comprising:
  (i) a solvent comprising water;
  (ii) a source of starch;
  (iii) a strengthening agent;
  (iv) a binding agent; and
  (v) a plasticizer;
(b) introducing the first moldable composition into a mold to form the first shaped body;
(c) baking the first shaped body; and
(d) covering at least a portion of the first shaped body with a first moisture-impermeable film.

BRIEF DESCRIPTION OF THE DRAWINGS

FIG. 2 is a highly schematic exploded view of a package in accordance with a second embodiment of the present invention.

BEST MODE FOR CARRYING OUT THE INVENTION

Figure 1:
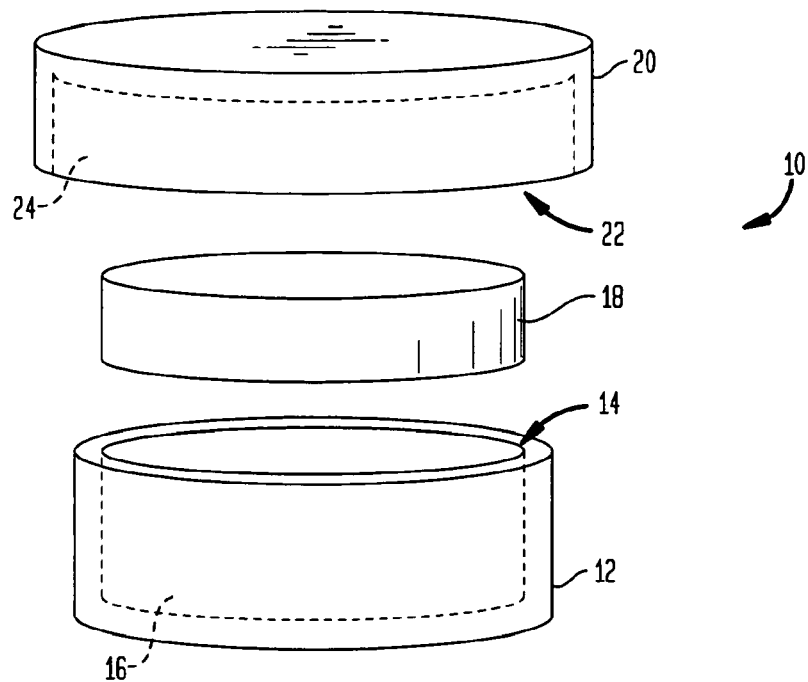
FIG. 1 is a highly schematic exploded view of a package in accordance with a first embodiment of the present invention.

The term "biodegradable" as used herein is generally known in the art as a material capable of being broken down especially into innocuous products by the action of living things (such as microorganisms). Thus, the present invention contemplates that one or more ingredients used to make the moldable composition and/or the moisture-impermeable, film-forming composition may be substituted with non-food-grade equivalents to the extent that the biodegradability of the package is not compromised.

The term "food-grade" as used herein refers to an ingredient that is ingestible by, and non-toxic, to humans. A food-grade ingredient, as used in the present invention, does not necessarily impart palatability or nutrition to a food product. Thus, Applicants' usage of the term "food-grade" is believed to be substantially consistent with the criteria described in Chapter 21 of the *Code of Federal Regulations*, promulgated by the U.S. Food and Drug Administration. In addition, harvesting of any food-grade ingredients for use in the present invention will have a negligible impact on the global food supply.

Other than in the operating examples, or where otherwise indicated, all numbers expressing quantities of ingredients and/or reaction conditions are to be understood as being modified in all instances by the term "about," which for purposes of the present invention may be ±20% by weight, and in some other embodiments ±10% by weight, or ±5% by weight of any given value described herein.

Moldable Compositions

The packages of the present invention are formed from moldable compositions which, in turn, are made from biodegradable ingredients. These ingredients include a solvent which includes water, a starch-containing material, a strengthening agent, a binding agent, a plasticizer, and optional ingredients such as bulking agents and auxiliary agents. In preferred embodiments, at least a portion of these ingredients, and desirably all of these ingredients, are of a food-grade.

Solvent

Suitable solvents for use in the present invention include water. Water is typically employed in an amount of at least about 5% by weight, preferably at least about 10% by weight, and more preferably at least about 20% by weight of the moldable composition. The upper limit is relatively unimportant in the sense that excess water will evaporate with baking. However, in preferred embodiments, the amount of water is selected to avoid unduly long baking times. Thus, amounts of water generally range from about 5% to about 60% by weight, preferably from about 10% to about 50% by weight, and more preferably from about 20% to about 30% by weight, based on the weight of the total moldable composition.

Additional water-miscible solvents may be present, including, for example, glycols, e.g., ethyl, propyl and butyl glycols.

The amount of solvent present in the shaped body included in the package, e.g., after baking, is typically less than about 5% by weight, preferably less than about 3% by weight, and more preferably less than about 1% by weight, based on the total weight of the shaped body.

Starch-Containing Material

Suitable starch-containing materials for use in the present invention are derived from vegetable sources such as corn, tapioca, wheat, rice, rye, barley, millet, oats, sorghum, and the like, including combinations thereof. These sources of starch are most conveniently available commercially in the form of flour. Two main constituents of starch are amylase and amylopectin. Amylase provides stiffness and rigidity to the shaped body, due in part to its ability to form a gel when hydrated and then form a rigid solid upon cooling. In addition, it is non-sticky relative to amylopectin. Amylopectin, on the other hand, becomes relatively viscous when hydrated, with less gel strength than amylopectin. Thus, preferred starch-containing materials are those which possess high amounts of amylase relative to amylopectin. One such material is long-grain rice flour which is particularly preferred for use in the present invention.

Other starch-containing materials, including those in which the starch has been chemically modified, obtained by fermentation, or derived from recombinant origin, may also be useful.

Useful starch-containing materials may further include starch derivatives, i.e., those sources of starch whose properties have been altered by changing the natural amylase/amylopectin ratio or by carrying out a pregelatinization, a partial hydrolytic degradation or a chemical derivatization.

In preferred embodiments, the source of starch is substantially free of gluten, which for purposes of the present invention refers to a source of starch that contains less than about 0.5% by weight of gluten, based on the total weight of the moldable composition.

The starch-containing material, e.g., vegetable flour, is typically present in an amount of at least about 25% by weight, preferably at least about 30% by weight, and more preferably at least about 35% by weight, based on the weight of the moldable composition. Thus, amounts of the starch-containing material generally range from about 25% to about 55% by weight, and in some embodiments, from about 30% to about 50% by weight, and in some other embodiments, from about 35% to about 45% by weight, based on the total weight of the moldable composition.

Strengthening Agent

Strengthening agents lend rigidity and structure to the molded composition. Suitable food-grade strengthening agents for use in the present invention include cellulosic fibers. The cellulosic fibers may be obtained, from oak, pine, maple, straw, corn stalks, rice hulls, wheat, oat, barley, oat chaff, coconut shells, peanut shells, walnut shells, jute, bagasse, bamboo, flax, kenaff, and the like (including various cellulosic gums), including any combination of the foregoing. The fibers will typically possess the following properties: a length of at least about 20 microns; a moisture content of at least about 8% by weight, based on the weight of the fiber; and an ash content of no more than about 5% by weight, based on the weight of the fiber.

A particularly preferred strengthening agent is oat fiber, which may contain as much as 96% or more fiber (e.g., about 70% cellulose and about 25% hemicellulose), and wherein the fibers may have an average length of about 250 microns and an average thickness of about 25 microns.

The strengthening agent is typically employed in an amount of at least about 2% by weight, preferably at least about 4% by weight, and most preferably at least about 6% by weight, based on the weight of the moldable composition. Too much of the strengthening agent, e.g., fibers, should be avoided—the shaped body would be subject to tearing when sheared, causing deformation in the final surface. Thus, amounts of the strengthening agent generally range from about 2% to about 20% by weight, and in some embodiments, from about 4% to about 16% by weight, and in some other embodiments, from about 6% to about 12% by weight, based on the total weight of the moldable composition.

Binding Agent

Binding agents aid in rigidity and decrease spoilage (due to microorganisms). Salts, e.g., alkali metal and alkaline earth metal salts, may be suitable binding agents. A preferred binding agent is sodium chloride, such as table salt (e.g., commercially available from Cargill under the tradename Diamond® salt).

The binding agent is typically employed in an amount of at least about 0.1% by weight, preferably at least about 0.25% by weight, and most preferably at least about 0.5% by weight, based on the total weight of the moldable composition. Thus, amounts of the binding agent generally range from about 0.1% to about 5%, and in some embodiments, from about 0.25% to about 2.5%, and in some other embodiments, from about 0.5% to about 1.5%, based on the total weight of the moldable composition.

Plasticizer

A plasticizer is used to lend pliability to the composition prior to baking. In those embodiments wherein the shaped bodies are prepared by baking in a mold, the plasticizer facilitates release or detachment of the body from the mold. Suitable plasticizers include animal fats, vegetable fats and lecithin, all of which are preferably used in hydrogenated form, as well as food-grade derivatives thereof. Particularly preferred plasticizers for use in the present invention include vegetable shortening (commercially available, e.g., from the J.M. Smucker Company, under the trademark Crisco®), and gluten. These plasticizers may be used either separately or in combination in the moldable composition.

The plasticizer is typically employed in an amount of at least about 1.5% by weight, preferably at least about 2% by weight, and most preferably at least about 3% by weight, based on the total weight of the moldable composition. Thus, amounts of the plasticizer generally range from about 1.5% to about 10% by weight, and in some embodiments, from about 2% to about 8% by weight, and in some other embodiments, from about 3% to about 6% by weight, based on the total weight of the moldable composition.

Bulking Agent

The moldable compositions may also contain a bulking agent. These agents facilitate the baking process. Bulking agents typically include a reducing sugar, e.g., sucrose, glucose, fructose, lactose, maltose, and combinations thereof. Convenient sources of reducing sugars include confectioner's sugar and granulated sugar, both of which contain sucrose. Reducing sugars are susceptible to the Maillard reaction (a chemical reaction between an amino acid and a reducing sugar, usually requiring heat) and caramelization, both of which cause browning. Thus, preferred embodiments of the present invention replace a portion of the reducing sugar(s) with a non-reducing sugar, which reduces the extent of these phenomena. The use of a non-reducing sugar as a bulking agent may also promote more even coloration of the shaped body, as well as adhesion of the moisture-impermeable film to the shaped body. Examples of non-reducing sugars include maltodextrin. The bulking agent is typically employed in an amount of about 8% to about 25% by weight, and in some embodiments, from about 10% to about 20% by weight, and in some other embodiments, from about 12% to about 18% by weight, based on the total weight of the moldable composition.

Auxiliary Agents

The moldable compositions may also contain one or more auxiliary agents. Representative auxiliary agents include preservatives and coloring agents. Examples of preservatives include ethanol, citric acid, ascorbic acid, sodium benzoate, raisin paste, and combinations thereof. Natural and artificial coloring agents may be useful. Natural colouring agents such as saffron, paprika, beetroot, crocein and carotene are preferred. The amount of coloring agent can be determined simply by visual requirements.

Fabrication Process

According to one embodiment of the present invention, the moldable composition may be made by, in one container, mixing the plasticizer at about 25° C. at low speed for about 1 minute and then adding the solvent at about 32° C. to the plasticizer and mixing the two ingredients at low speed for about 30 seconds. In a separate container, all the remaining ingredients may be mixed together at low speed for about 5 minutes. The contents of the two containers may then be combined and mixed at low speed for about 10 minutes. Once completed, the moldable composition may be stored, if desired, typically at a temperature of about 27° C. to about 32° C. until molding and baking.

The moldable composition may be formed into a body having a desired shape using techniques known in the art. Such techniques include pressing, extrusion, casting, injection molding and the like. The viscosity and other forming characteristics of the moldable composition may be tailored to the particular forming process to be employed in accordance with techniques that are well known in the art. A particularly preferred forming process according to the present invention is one in which the composition is poured or pressed into a mold which is shaped and dimensioned to produce a package capable of accommodating a consumer product. Examples of such products include foods, both dry and not dry, cosmetics (e.g., including hair care products, skin care products, such as mascara, eye shadow, lipstick, lip gloss, foundation, pressed powder, loose powder, and eyebrow gel), small articles such as those sold in cardboard boxes or in blister packages, shopping bags of paper and cloth, boxes of every type from delivery boxes to gift boxes to cardboard crates and so on.

The molded package may then be baked. The baking process may be performed directly in the mold where the mold is needed to retain the shape of the molded body or, where possible, the molded body may be removed from the mold prior to baking. The time and temperature of baking are indirectly proportional. In that regard, the lower the temperature, the longer the baking time, and the higher the temperature, the shorter the baking time. Operating conditions are chosen to minimize baking time without compromising the basic qualities of the resultant shaped body, particularly from the standpoints of structural integrity (e.g., rigidity) and aesthetic appeal. Baking is typically carried out at a temperature of from about 100° C. to about 250° C. for approximately 10 to 20 minutes.

At least a portion of the shaped body (and preferably the entire shaped body) is then covered with a moisture-impermeable film. The film is formed from a composition containing at least one coating material. Suitable coating materials include cellulose, gums such as guar or Arabic, waxes (e.g., in emulsion form), starches, gluten, egg albumin, egg white, food-grade shellac, whey protein, lecithin and combinations thereof. A variety of additives may be included in the composition depending on the nature of the film to be produced. Coloring agents are one such example. As in the case of the moldable composition, the coloring agent, which may include natural and artificial agents alike, is added to impart color to the film. Natural coloring agents such as saffron, paprika, beetroot, crocein and carotene are preferred. The amount of coloring agent to be added can be easily determined by visual requirements.

The film-forming composition may be made into a viscous mixture using well-known techniques and applied directly onto the shaped body. Application may be by spraying, dipping or other methods. Alternatively, the viscous mixture may be cast or otherwise formed into a film which may then be applied to the shaped body.

The moldable compositions and forming techniques described above may be used to form packages for consumer products, including packages for cosmetic products. A package according to one embodiment of the present invention is shown in FIG. 1. Package 10 includes a first or lower body 12 having an opening 14 to a cavity 16 (shown in dashed lines) for receiving a product, such as a cake of facial makeup 18. Lower body 12 may be formed from a first moldable composition as described above. A second or upper body 20 is adapted to close the opening in lower body 12. Body 20 may be formed from a second moldable composition as described above. The second moldable composition may be the same as or different from the first moldable composition from the standpoint of composition, shape or both composition and shape. Body 20 may include an opening 22 to a cavity 24 (shown in dashed lines) sized and shaped to lower body 12. That is, lower body 12 may be formed with an outer diameter X, and the cavity 24 in upper body 20 may be formed with a diameter Y which is slightly larger than diameter X so that lower body 12 is receivable in cavity 24 in a force-fit fashion. The inner side walls of cavity 24 and/or the outer side walls of lower body 12 may be tapered so that the side walls become more tightly engaged as lower body 12 and upper body 20 are pressed together. Although package 10 according to this embodiment is shown with a cylindrical cross-section, the packages of the present invention may be formed with any cross-sectional shape desired.

A package 30 according to another embodiment of the present invention is shown in FIG. 2. Package 30 includes a first or lower body 32 which is substantially the same as body 12 of package 10 described above. That is, lower body 32 has an opening 34 to a cavity 36 (shown in dashed lines) for receiving a product, such as makeup 37. However, rather than having an upper body which fits around the outer circumference of lower body 32, package 30 includes a second body or lid 38 which closes opening 34. Thus, lid 38 has a first portion 40 having a diameter which is substantially the same as the outer diameter of lower body 32. A lower disk-shaped portion 42 has a diameter which is slightly smaller than the diameter of the opening 34 in lower body 32. When lid 38 is assembled to lower body 32, the lower portion 42 of the lid frictionally engages the inner side walls of opening 34 to hold the lid in assembled relationship to the lower body. Again, lower body and lid 38 may be formed from the same or different moldable compositions as described herein.

The foregoing describes only two exemplary embodiments of the packages which may be formed in accordance with the present invention. Thus, packages having any shape or configuration may be formed as desired.

Furthermore, although packages 10 and 30 are described as having first and second bodies formed from moldable compositions as described herein, the present invention is not limited thereto. That is, it is contemplated that only one of the first and second bodies may be formed from a biodegradable moldable composition as described herein, while the other body is formed from a conventional material, such as plastic or metal. For example, where a lower body having a cavity for receiving a consumer product is formed from a moldable composition having a series of threads adjacent the opening thereof, the second body may be more accurately molded from a plastic material having inner threads which are sized to mate with the threads on the lower body.

The present invention will be better understood from the examples which follow, all of which are intended for illustrative purposes only, and are not meant to unduly limit the scope of the invention in any way.

EXAMPLES

Example 1

Moldable Compositions

| Ingredient | Supplier | No Added Color wt % | White Color Added wt % | Red Color Added wt % |
|---|---|---|---|---|
| Vegetable Shortening | Crisco | 5.95 | 6.01 | 5.67 |
| Long Grain Rice Flour | Riviana RL100 | 39.68 | 38.48 | 37.24 |
| Oat Fiber | Rettenmaier HF200 | 7.74 | 7.82 | 7.37 |
| Salt | Domino Extra Fine | 14.88 | 15.03 | 14.18 |
| Titanium Dioxide |  |  | 1.60 |  |
| Red Iron Oxide |  |  |  | 0.57 |
| Water 90F |  | 31.75 | 31.06 | 34.97 |
| Total |  | 100.00 | 100.00 | 100.00 |

Biodegradable, shaped bodies made from the moldable compositions described in the above-table were prepared in accordance with the following procedures.

Benchtop Process

Dough

1. Combine and mix all dry ingredients at low speed for 5 minutes. Set aside.

2. Mix shortening and water at low speed for 30 sec.

3. Add dry ingredients to water/shortening mixture and mix at low speed for 10 minutes.

Cookie Molding and Baking

1. Hold dough in plastic bag and keep warm by placing in 90° F. water.

2. Place and pat dough, sufficient to fill mold, into floured mold.

3. Place a sheet of wax paper on top and invert on pie press platform.

4. Press for 4 sec.

5. Discard wax paper.

6. Extract molded dough using shop vacuum with perforated plate attachment (drapery vacuum attachment)

7. Trim and discard excess dough.

8. Place molded dough piece on baking screen.

9. Bake in oven at 375° F. with convection for 14 minutes.

10. Remove from oven and allow to cool on the baking screen.

Example 2

Moisture-Impermeable Moldable Composition

|  | Dough (wt %) |
|---|---|
| Rice Flour | 40.0 |
| Oat fibre | 8.0 |
| Salt | 1.0 |
| Confectioner's sugar | 9.0 |
| Maltodextrin | 9.0 |
| Cellulosic fibers | 1.0 |
| Gluten | 1.0 |
| Vegetable Shortening | 4.5 |
| Colorant | 2.0 |
| Water | 24.5 |
| Total | 100 |

INDUSTRIAL APPLICABILITY

The present invention has applicability in the field of biodegradable packaging for consumer goods such as cosmetic compositions.

All publications cited in the specification, both patent publications and non-patent publications, are indicative of the level of skill of those skilled in the art to which this invention pertains. All these publications are herein incorporated by reference to the same extent as if each individual publication were specifically and individually indicated as being incorporated by reference.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A biodegradable package, comprising:
   a first shaped body formed from a first composition including:
   (i) a starch-containing material comprising vegetable flour in an amount of at least about 35% by weight;
   (ii) a strengthening agent comprising cellulosic fibers in an amount of about 2% to about 20% by weight;
   (iii) a binding agent comprising sodium chloride in an amount of about 0.1% to about 5% by weight;
   (iv) a plasticizer comprising a vegetable fat, gluten, or a mixture thereof in an amount of about 1.5% to about 10% by weight; and
   (v) a bulking agent, comprising a reducing sugar comprising glucose, fructose, lactose, maltose, or mixtures of two or more thereof, and a non-reducing sugar comprising maltodextrin, in an amount of about 8% to about 25% by weight; and
   a first moisture-impermeable film covering at least a portion of the first shaped body.

2. The biodegradable package of claim 1, wherein the first body defines a cavity having an opening, the package further including a second shaped body formed from a second composition including:
   (i) a starch-containing material comprising vegetable flour in an amount of at least about 35% by weight;
   (ii) a strengthening agent in an amount of about 2% to about 20% by weight;
   (iii) a binding agent in an amount of about 0.1% to about 5% by weight;
   (iv) a plasticizer in an amount of about 1.5% to about 10% by weight; and
   (v) a bulking agent, comprising a reducing sugar and a non-reducing sugar, in an amount of about 8% to about 25% by weight; and
   a second moisture-impermeable film covering at least a portion of the second body.

3. The biodegradable package of claim 1, wherein the starch-containing material includes long-grain rice flour.

4. The biodegradable package of claim 2, wherein the first composition, the second composition or both the first and second compositions further include an auxiliary agent.

5. The biodegradable package of claim 4, wherein the auxiliary agent is selected from the group consisting of colorants and preservatives.

6. The biodegradable package of claim 2, wherein the first body has an outer cross-sectional size and the second body defines a cavity having an opening with an inner cross-sectional size larger than the outer cross-sectional size, whereby the first body is adapted to be received in the opening of the second body.

7. The biodegradable package of claim 2, wherein the first and second bodies are formed by a molding process.

8. The biodegradable package of claim 2, wherein the first film, the second film or both the first and second films include at least one coating material selected from the group consisting of cellulose, gums, waxes, starches, gluten, egg albumin, egg white, food-grade shellac, whey protein, lecithin and combinations thereof.

9. The biodegradable package of claim 1, further including a cosmetic product disposed in the first body.

10. The biodegradable package of claim 9, wherein the cosmetic product is selected from the group consisting of mascara, eye shadow, lipstick, lip gloss, foundation, pressed powder, loose powder and eyebrow gel.

11. The biodegradable package of claim 1, further including a cosmetic product disposed in the first shaped body.

12. A biodegradable package, made by a process comprising:
   (a) preparing a moldable composition comprising:
   (i) a solvent comprising water in an amount of about 20% to about 30% by weight;
   (ii) a starch-containing material comprising vegetable flour in an amount of at least about 35% by weight;
   (iii) a strengthening agent comprising cellulosic fibers in an amount of about 2% to about 20% by weight;
   (iv) a binding agent comprising sodium chloride in an amount of about 0.1% to about 5% by weight;
   (v) a plasticizer comprising vegetable fat, gluten or a mixture thereof in an amount of about 1.5% to about 10% by weight; and
   (vi) a bulking agent, comprising a reducing sugar and a non-reducing sugar comprising maltodextrin, in an amount of about 8% to about 25% by weight;
   (b) forming the moldable composition into a shaped body;
   (c) baking the shaped body; and
   (d) covering at least a portion of the shaped body with a moisture-impermeable film.

* * * * *